UNITED STATES PATENT OFFICE.

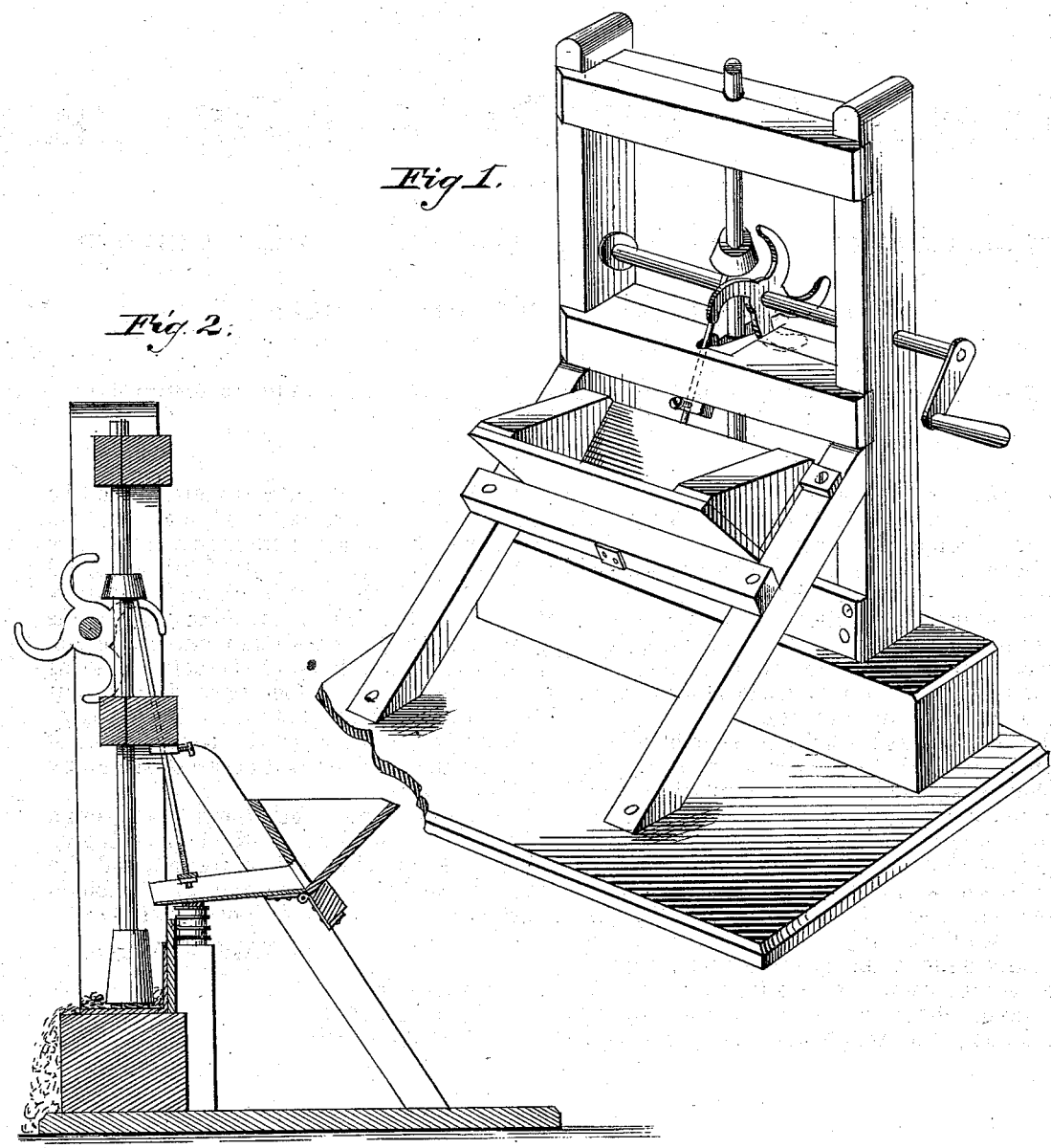

THOMAS J. WOOD, OF SONORA, CAL., ASSIGNOR TO JOHN D. REDMOND.

IMPROVEMENT IN QUARTZ-MILL FEEDERS.

Specification forming part of Letters Patent No. 155,628, dated October 6, 1874; application filed June 4, 1873.

*To all whom it may concern:*

Be it known that I, THOMAS J. WOOD, of Sonora, Tuolumne county, State of California, have invented an improved machine to be used as a substitute for manual labor in feeding crushing-mills, particularly applicable to mills used for crushing quartz and other metalliferous ores; and I do hereby declare that the following is a full and exact description of said machine and invention.

The machine, as a whole, consists of a hopper, into which the rock or other matter to be crushed is put; of a trough, supplied by and from the aforesaid hopper and placed immediately under it, and connected therewith by hinges, and intended to supply and so placed as to let the matter to be crushed fall into the battery and under the stamps or other appliances used for crushing the material, at such times and in such quantity as the stamps require material for crushing; of a spring made of steel, or of india-rubber and iron in alternate layers, placed under the trough, and intended to regulate the supply of the raw material to the battery; and of a straight rod, made of iron or other material, going through a cross-piece fastened to the trough, said rod being secured to the cross-piece by nuts above and below the same. The rod or bar aforesaid extends up to and comes immediately under the tappet of the center stamp of the battery, so as to be struck by the tappet when there is but little quartz or other material in the battery.

Having thus described the construction of my invention, I claim and desire to secure by Letters Patent—

The spring under the trough, the trough for conveying the ore from the hopper, the vibrating rod attached to the trough, and the tappet upon the stamping-rod, all combined together as and for the purposes described.

THOS. J. WOOD.

In presence of—
   J. D. REDMOND,
   EDWD. S. HAST.